United States Patent [19]

Andrews

[11] 3,750,032

[45] July 31, 1973

[54] PRIORITY CHANNEL SCANNING SYSTEM WITH DUAL RESPONSE TIME CONTROL

[75] Inventor: James E. Andrews, Schaumburg, Ill.

[73] Assignee: Motorola, Inc., Franklin Park, Ill.

[22] Filed: Feb. 24, 1972

[21] Appl. No.: 228,980

[52] U.S. Cl. .................. 325/470, 325/334, 343/206
[51] Int. Cl. .................. H04b 1/36
[58] Field of Search .................. 325/469, 470, 334, 325/464, 478, 407; 343/207, 208

[56] References Cited

UNITED STATES PATENTS

| | | | |
|---|---|---|---|
| 3,470,481 | 9/1969 | Myers et al. | 325/470 |
| 3,623,106 | 11/1971 | Zerega, Jr. | 325/469 |
| 3,654,555 | 4/1972 | Ryan | 325/478 |

*Primary Examiner*—Benedict V. Safourek
*Attorney*—Vincent J. Rauner and Eugene A. Larson

[57] ABSTRACT

A channel scanning and priority channel monitoring system for a multi-channel receiver includes a high frequency clock and a sequencing switch to rapidly scan the channels for signals and a low frequency clock and sampling switch to periodically monitor the priority channel for short time intervals during the reception of a non-priority signal. A variable response time squelch circuit is used to control the operation of the clocks. The squelch circuit operates in a fast response mode to rapidly sense the presence of a signal. After a signal has been acquired, the response time of the squelch circuit is determined by the strength of the signal being received, the squelch circuit operating in conjunction with a delay circuit to prevent the resumption of scanning during signal fades. A noise generator controlled by the variable response time squelch controls an audio muting squelch circuit in the receiver.

24 Claims, 3 Drawing Figures

PRIORITY CHANNEL SCANNING SYSTEM WITH DUAL RESPONSE TIME CONTROL

BACKGROUND

1. FIELD OF INVENTION

This invention relates generally to multi-frequency receivers, and more particularly to multi-frequency receivers having automatic switching apparatus for scanning several channels.

There are many applications wherein it is desirable to provide a receiver having switching apparatus for scanning a multiplicity of channels and for locking the receiver on a particular channel when a transmission is received. In many cases it is desirable to designate one of the channels as a priority channel, which is periodically sampled during the reception of another signal, in order that the receiver may be automatically tuned to the priority channel in the event of a transmission thereon.

2. PRIOR ART

The effectiveness of such a channel scanning system is largely dependent upon the response time of the detector employed to detect the presence of a signal on any of the channels. In order to provide rapid scanning of the channels and to limit the degradation of a non-priority signal caused by the periodic sampling of the priority channel, a rapid detector response time is required. In order to provide optimum detector sensitivity to assure detection of relatively weak signals and to maintain the system locked to a particular channel in the event of a signal fade, a slower response time is required. In addition, it is desirable to provide a fast response time to rapidly disable the receiver audio at the end of a transmission to eliminate the annoying noise burst that follows a transmission.

Channel scanning systems according to the prior art employ detectors having response times which are tailored to the requirements of the system. In systems wherein rapid scanning and sampling is required, fast response time detectors are used to provide the required sampling speed, however, system sensitivity and fade protection are sacrificed. Conversely, where maximum sensitivity and fade protection is required, scanning speed and priority monitoring performance are degraded.

SUMMARY

It is an object of the present invention to provide an improved channel scanning and priority monitoring system that provides good sensitivity and high speed operation.

It is a further object of this invention to provide a channel scanning and priority monitoring system that remains locked to the channel being monitored during signal fades.

It is another object of this invention to provide a channel scanning and priority monitoring system that remains locked to a channel being received during short pauses in the transmission.

A still further object of the invention is to provide a channel scanning and priority monitoring system that is compatible with a wide variety of receivers.

Still another object of the invention is to provide a channel scanning and priority monitoring system for a receiver that does not degrade the performance of the receiver.

In accordance with the invention, a multi-channel superheterodyne receiver includes oscillator means having a plurality of different outputs corresponding in frequency to the different channels to be received by the receiver. A switching unit, having different conditions of operation, controls the oscillator means in response to clock pulses obtained from a clock which provides clock pulses at a relatively high frequency and a relatively low frequency.

In the absence of a received carrier on any of the channels, operation of the switching unit is under the control of the high frequency pulses. Receipt of a carrier signal during a sampling interval causes an output to be obtained from a signal detector for making the switching unit responsive to the low frequency clock pulses.

If a channel on which the signal is detected is the priority channel, the switching unit remains set to this channel until the termination of the signals thereon. If, however, the signal detected is on a non-priority channel, the switching unit is periodically switched at the low frequency to the priority channel to sample the priority channel for the presence of a priority signal.

In addition, the detector includes means for varying the response time thereof in response to the strength of the signal being received and to the condition of operation of the switching means to make the response time of the switching means rapid during channel scanning and priority sampling, and relatively slow after a signal has been received to maintain the receiver locked to the received signal in the event of signal fades or other interruptions. A turn-on delay is also used in conjunction with the clock to prevent operation of the clock for a predetermined time duration following termination of a received signal to provide further signal fading protection and to allow the receiver to remain locked to a particular channel during momentary interruptions in the transmission.

A noise generator responsive to the detector means is employed to control the operation of the noise muting squelch circuitry of the receiver (in receivers so equipped) in response to the action of the detector, thereby providing noise muting, or squelch operation, when no signals are present.

DETAILED DESCRIPTION

Figure 1:
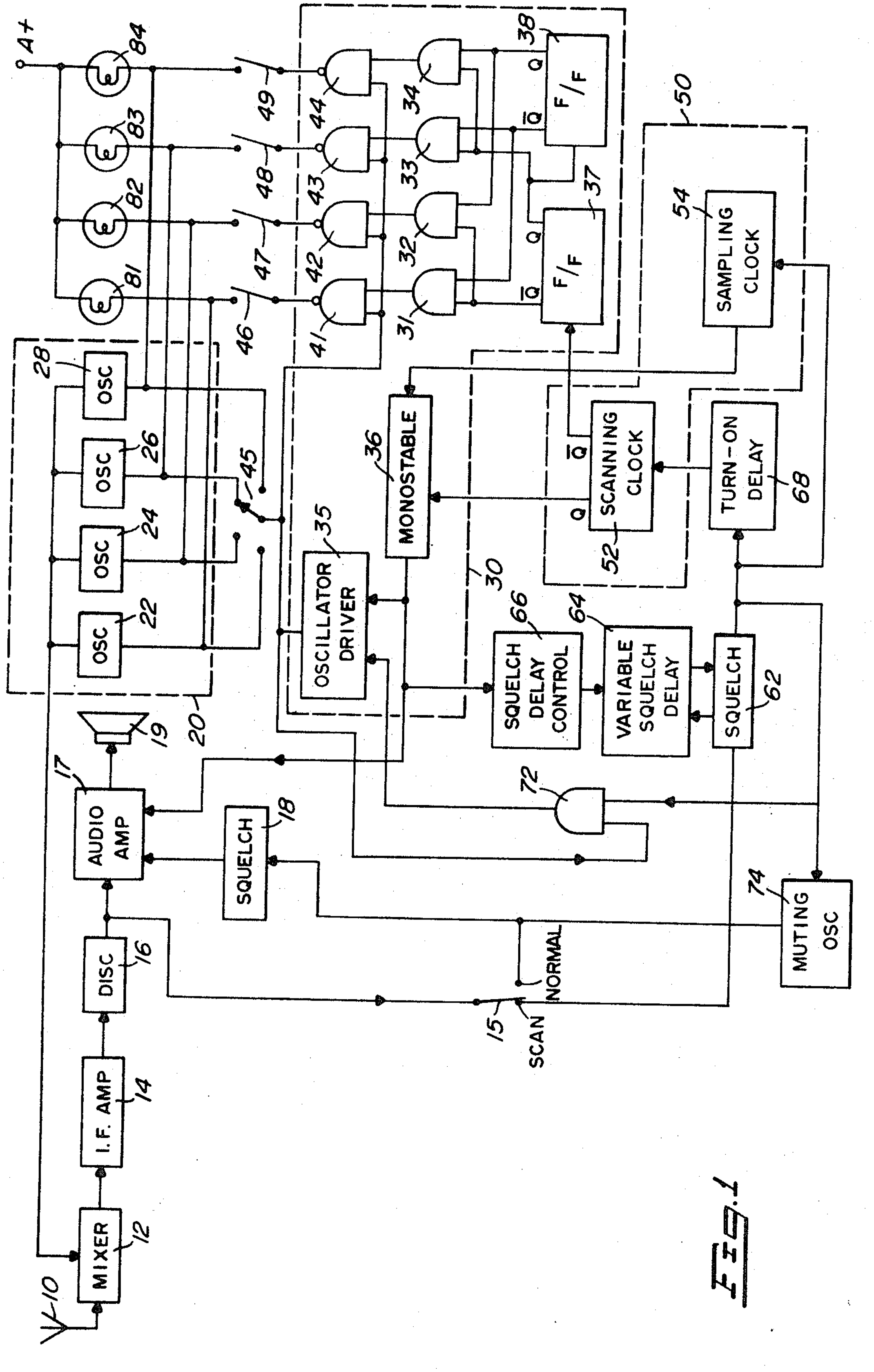
FIG. 1 is a block diagram representation of the channel scanning and priority monitoring system according to the invention as used in conjunction with an FM receiver.

Referring now to FIG. 1, there is shown a receiver of the superheterodyne type wherein signals received by an antenna 10 are applied to a mixing means, in this embodiment a mixer 12. The mixer 12 is controlled by an oscillator means 20 including, in this embodiment, oscillators 22, 24, 26 and 28, only one of which is rendered operative at a time. The output of the mixer 12 is applied through an IF amplifier 14 to a modulation detection means, in this embodiment, a discriminator 16, which detects the modulation on the received signal. The demodulated signal is applied through an audio amplifier 17 to a loudspeaker 19 for reproduction. In addition, the demodulated signal is applied to a switch 15 for selective coupling to the scanning circuit or to a squelch circuit 18. The squelch circuit 18, coupled to audio amplifier 17, renders audio amplifier 17 operative upon receipt of a signal by the receiver to allow reproduction of the signal by loudspeaker 19. Although a frequency modulation receiver is employed in this embodiment, it should be noted that the techniques and apparatus of the present invention also apply to other types of receivers, including amplitude modulation receivers.

The oscillator means 20 is controlled by a switching means 30 which is coupled to oscillator means 20 through a priority selector switch 45 and through non-priority selector switches 46, 47, 48 and 49. Switching means 30 comprises, in this embodiment, an oscillator driver 35 which is driven by a monostable 36, interconnected flip-flops 37 and 38 which drive AND gates 31, 32, 33 and 34, and NAND gates 41, 42, 43 and 44.

Switching means 30 is controlled by a clock means 50 comprising, in this embodiment, scanning clock 52 connected to monostable 36 and flip-flop 37, and sampling clock 54 connected to monostable 36.

The operation of clocks 52 and 54 is controlled by a squelch circuit 62 coupled to the receiver through switch 15 and to clocks 52 and 54, the connection to clock 52 being through a turn-on delay circuit 68. A variable squelch delay circuit 64 is coupled to squelch circuit 62 to control the response time of the squelch circuit. The variable squelch delay 64 is controlled by a squelch delay control 66 connected to switching means 30.

A priority detect gate 72 having inputs connected to squelch circuit 62 and to the oscillator driver 35 has an output connected to the oscillator driver 35 to prevent scanning and sampling when priority channel is received.

A muting oscillator 74 is connected to squelch circuit 62 and to squelch circuit 18 and causes squelch circuit 18 to operate in response to the signal from squelch circuit 62.

In operation, when no signals are being received by the receiver, the output signal from squelch circuit 62 is high, thereby causing scanning clock 52 to be operative and sampling clock 54 to remain inoperative. The output of scanning clock 52 is, in this embodiment, a square wave signal having a 50 percent duty cycle and having a period of approximately 12–14 milliseconds. Two complementary, or inverted, outputs are provided at output points Q and $\bar{Q}$ of the scanning clock 52.

The $\bar{Q}$ output is connected to flip-flop 37 which is further connected to flip-flop 38 to form a binary counter. In this embodiment, flip-flop 37 is triggered on negative transitions of the square wave from scanning clock 52, and changes state every 12–14 milliseconds. AND gates 31, 32, 33 and 34 are standard AND gates having HI and LO output states as is well known in the art, and having the characteristic that they provide a HI output only if both inputs are HI. Gates 31 through 34 are coupled to flip-flops 37 and 38 and to each other so that only one gate can have a HI output at any given time, and so that the HI output is sequenced from one gate to the next each time flip-flop 37 is triggered.

Four standard NAND gates 41 through 44 are coupled to AND gates 31 through 34, respectively, and to oscillator driver 35. NAND gates 41 through 44 provide a LO output when both inputs are HI. Gates 41 through 44 are coupled to oscillators 22, 24, 26 and 28 by means of switches 46 through 49, respectively, and cause the oscillator associated with the gate having the LO output to oscillate. Indicator lights 81 through 84, which are connected between the power supply A+ and switches 46 through 49, indicate which oscillator has been selected. It should be noted that gates are provided to operate four oscillators but any number may be used and still fall within the scope of the invention.

The Q output of scanning clock 52 is connected to monostable 36. Monostable 36 is triggered by negative transitions of the signal appearing at the Q output of scanning clock 52, the negative transitions appearing at Q being coincident in time with the positive transitions of the signal appearing at $\bar{Q}$. Monostable 36 provides output pulses having time durations equal to approximately one half of a cycle of the signal from scanning clock 52, or approximately 6–7 milliseconds in this embodiment. The output pulses drive oscillator driver 35 which provides a LO output when a pulse is being received. Oscillator driver 35 is coupled to gates 41 through 44 and to oscillators 22 through 28 through priority selector switch 45, which determines the channel that is afforded priority.

In the scanning mode, a pulse is applied to flip-flop 37 from scanning clock 52 approximately every 14 milliseconds. This causes the HI signal to sequence between gates 31 through 34 at the 12–14 millisecond rate. If the output signal from oscillator driver 35 were allowed to remain HI, the sequencing HI signal from gates 31 through 34 would cause a LO signal to sequence between gates 41 through 44 at a 14 millisecond rate to sequentially energize oscillators 22 through 28 at the 12–14 millisecond rate. However, due to the drive from monostable 36, the output of oscillator driver 35 is driven LO during the last portion of each 12–14 millisecond interval. When the output of oscillator driver 35 is driven LO, the output of each of the gates 41 through 44 is driven HI, thereby de-energizing oscillators 22 through 28 during the last half of each 12–14 millisecond interval. Simultaneously, the LO signal from oscillator driver 35 is coupled through the priority selector switch 45 to a selected one of oscillators 22, 24, 26 or 28 to energize the selected oscillator. The channel selected by the energized oscillator will be hereinafter referred to as the priority channel. Hence, the priority channel is sampled every 12–14 milliseconds for 6–7 milliseconds between sequencing of the non-priority channel samples.

If a signal is received on any of the channels, a decrease in noise is obtained at the output of discriminator 16 which causes the output signal from squelch circuit 62 to decrease. The signal decrease at the output of squelch circuit 62 causes scanning clock 52 to turn off, and turns on sampling clock 54. When scanning clock 52 is turned off, flip-flop 37 is no longer triggered and the sequencing of gates 41 through 44 is suspended, with the gate having the LO output at the time that a signal was detected maintaining its LO output. The sampling clock 54 provides pulses to monostable 36 at a much lower rate than the pulse rate of scanning clock 52. In this embodiment, sampling clock 54 provides a pulse to monostable 36 every 250 milliseconds.

Upon receipt of a pulse from a sampling clock 54, monostable 36 provides a pulse having a duration of approximately 6–7 milliseconds to oscillator driver 35. Upon receipt of the pulse from monostable 36, the output of oscillator driver 35 becomes LO to energize the priority channel oscillator and to disable the non-priority oscillator by means of the LO signal applied to gates 41 through 44. The priority channel is monitored for the 6–7 millisecond duration of the pulse from monostable 36. If no signal is received on the priority channel during this time, the non-priority channel will again be monitored for the remainder of the 250 millisecond period between sampling clock pulses.

The output of monostable 36 is also connected to audio amplifier 17 for muting audio amplifier 17 during the time that the priority channel is being sampled. This eliminates the annoying noise burst or clicks that would be present while a priority channel having no signal thereon was being sampled.

If a signal is present on the priority channel, the output of squelch circuit 62 remains low while the priority channel is being sampled. The output of squelch circuit 62 is coupled to a priority locking gate 72 which has a second input connected to the output of oscillator driver 35. The output of gate 72 is coupled to oscillator driver 35 to maintain oscillator driver 35 locked to the priority channel when the input to gate 72 from squelch circuit 62 is low and the input from oscillator driver 35 is also low, indicating that the priority channel is being sampled and a priority signal has been received.

The priority channel is, therefore, continuously monitored as long as a priority signal is present. At the termination of the priority signal, the non-priority channel that was being monitored immediately preceding the acquisition of the priority signal will again be sampled. This allows the completion of any conversation that may have been initiated on the non-priority channel before the priority signal was received. If no signal is present on the last sampled non-priority channel, scanning is resumed.

In order to provide optimum performance for a channel scanning and priority system, squelch circuit 62 must have a variable response time. In the scanning mode and particularly in priority sampling, the response time of the squelch must be fast to allow rapid sampling of the various channels and to avoid chopping a large hole in the audio of the non-priority channel during the time that the priority channel is being sampled. Once a channel has been acquired, however, it is desirable that the response time of the squelch circuit 62 be lengthened to prevent reinitiation of scanning in the event of a momentary decrease in the level of the signal being monitored.

The variable response functions are accomplished by squelch circuit 62, variable squelch delay 64, squelch delay control 66 and turn-on delay 68. Variable squelch delay 64 is connected to, or may be incorporated in, squelch circuit 62. Variable squelch delay 64 determines the response time of squelch circuit 62. The length of the response time provided by variable squelch delay 64 is determined by the strength of the signal being received by the receiver and by the action of squelch delay control 66, which is connected to squelch delay 64 and monostable 36. The delay time is inversely proportional to the strength of the signal being received by the receiver because signal loss due to fading is not a problem in strong signal situations, and the fade protection provided by a slow response time is not necessary when strong signals are being received. During sampling, however, a fast squelch response is necessary regardless of the strength of a signal (if any) being received. A fast squelch response is obtained by applying the priority sampling pulses from monostable 36 to squelch delay control 66 to cause squelch delay control 66 to minimize the response time of squelch circuit 62 during priority sampling and for a predetermined time thereafter to minimize the interruptions to the non-priority signal caused by the sampling of the priority signal.

Assuming that a signal has been received on one of the channels, and that that signal is a non-priority signal, the response time of squelch circuit 62 will be determined, except during priority samples, by the strength of the non-priority signal being received. If the signal is weak, the response of squelch circuit 62 will be slow, thereby preventing fades in the signal from being interpreted as a termination of transmission by squelch circuit 62. If the signal is relatively strong, such as, for example, a signal providing 20 db or more of audio quieting, the squelch response time will be fast to assure rapid muting of the audio following termination of the transmission. However, turn-on delay 68 is interposed between squelch circuit 62 and scanning clock 52 to prevent reinitiation of scanning by clock 52 for a predetermined time following the termination of a transmitted signal. The turnon delay provided by turn-on delay circuit 68 provides three functions. Firstly, it provides fade protection in addition to the protection provided by squelch circuit 62 during weak signals, and provides fade protection for unusually deep fades that sometimes occur even in strong signals. This assures a greater probability of remaining locked to a channel which has a signal, once that signal has been acquired. Secondly, since a large number of two-way radio conversations comprise a series of relatively short transmissions, it is desirable to remain locked to a channel between transmissions to assure prompt acquisition of subsequent short transmissions on the channel, and to prevent undue interruption of the conversation which could result from another non-priority signal being received if scanning were reinitiated between transmissions. Thirdly, when a non-priority transmission is interrupted by a priority transmission, it is desirable to return to the non-priority channel following termination of the priority signal. Delaying the turn-on of the scanning clock 52 following termination of a signal maintains the switching means locked, and assures that the non-priority channel that was being monitored prior to the priority message is sampled before scanning is reinitiated. This allows completion of the previous non-priority conversation immediately following completion of the priority message in the event that the conversation is still in progress.

In addition to providing a variable response time squelch circuit for the scanning function, it is also desirable to provide a variable response time squelch for audio muting. The reasons for providing a variable response time for the audio muting squelch are similar to the reasons for providing a variable response time for the scanning squelch. For relatively weak signals having fades, a fast response time is not desirable because a fast response time causes an annoying muting and unmuting of the receiver during signal fades. For strong signals, where fading is not a problem, it is desirable to have a fast response to avoid the undesirable noise burst or "squelch tail" following a transmission. For receivers equipped with an audio muting squelch, such as squelch circuit 18, the variable response feature can be achieved by making squelch circuit 18 operate in response to squelch circuit 62.

If squelch circuit 18 is a discriminator noise detecting type squelch, control of squelch circuit 18 can be readily achieved through the use of a noise producing muting oscillator 74 which is operative in response to squelch circuit 62, as shown in FIG. 1. Noise detecting squelches, such as squelch circuit 18, detect the presence of noise at the output of the discriminator 16. When noise is present, indicating absence of a signal, the squelch circuit 18 applies a signal to audio amplifier 17 to mute audio amplifier 17. In the absence of noise at the output of the discriminator, squelch circuit 18 causes audio amplifier to become operative to amplify the audio signals from discriminator 16. Muting oscillator 74, which is connected to squelch circuit 18, is an oscillator that provides signals to squelch circuit 18 for control thereof. The signals from oscillator 74 may be noise signals similar to the signals present at the output of discriminator 16 in the absence of received signals, or may be relatively high frequency tones (15 KHz) which are detected by squelch 18 as are noise signals. When a signal has been detected by squelch circuit 62, the output of this circuit turns muting oscillator 74 off, thereby causing squelch circuit 18 to render audio amplifier 17 operative. Similarly, in the absence of a received signal, squelch circuit 62 causes muting oscillator 74 to provide signals to squelch circuit 18 to operate the same to mute audio amplifier 17. The response time of the muting circuit is, therefore, approximately the same as the response time of squelch circuit 62.

Switch 15 connects discriminator 16 to either squelch circuit 18 or squelch circuit 62, and is used to defeat the scanning mode. When the switch 15 has its armature in engagement with the "scan" contact to connect discriminator 16 to squelch circuit 62, operation of the circuit is as was previously described. When the armature is moved into engagement with the "normal" contact, squelch circuit 18 is operated by noise from discriminator 16 as if the channel scanning circuitry were not present. The absence of noise applied to squelch circuit 62 causes this circuit to have a high output on all channels. This is the condition that would be present if signals were present on all channels. Since it appears to the channel scanning circuit that a signal is present on all channels, the circuit will lock to that channel that has been selected a priority channel by selector switch 45. Hence, in the normal mode, scanning is defeated and any channel can be manually selected by means of priority selector switch 45.

In order to understand the operation of the channel scanning and priority monitoring system according to the invention, it is necessary to understand the operation of squelch circuit 62, the variable squelch delay 64 and the squelch delay control 66. Reference is made to U.S. Pat. No. 3,628,058 issued Dec. 14, 1971 to Roy H. Espe and to U.S. Pat. No. 3,660,765 issued May 2, 1972 to James R. Glasser and Stanley J. Tomsa, both patents assigned to Motorola Inc.

Figure 2:
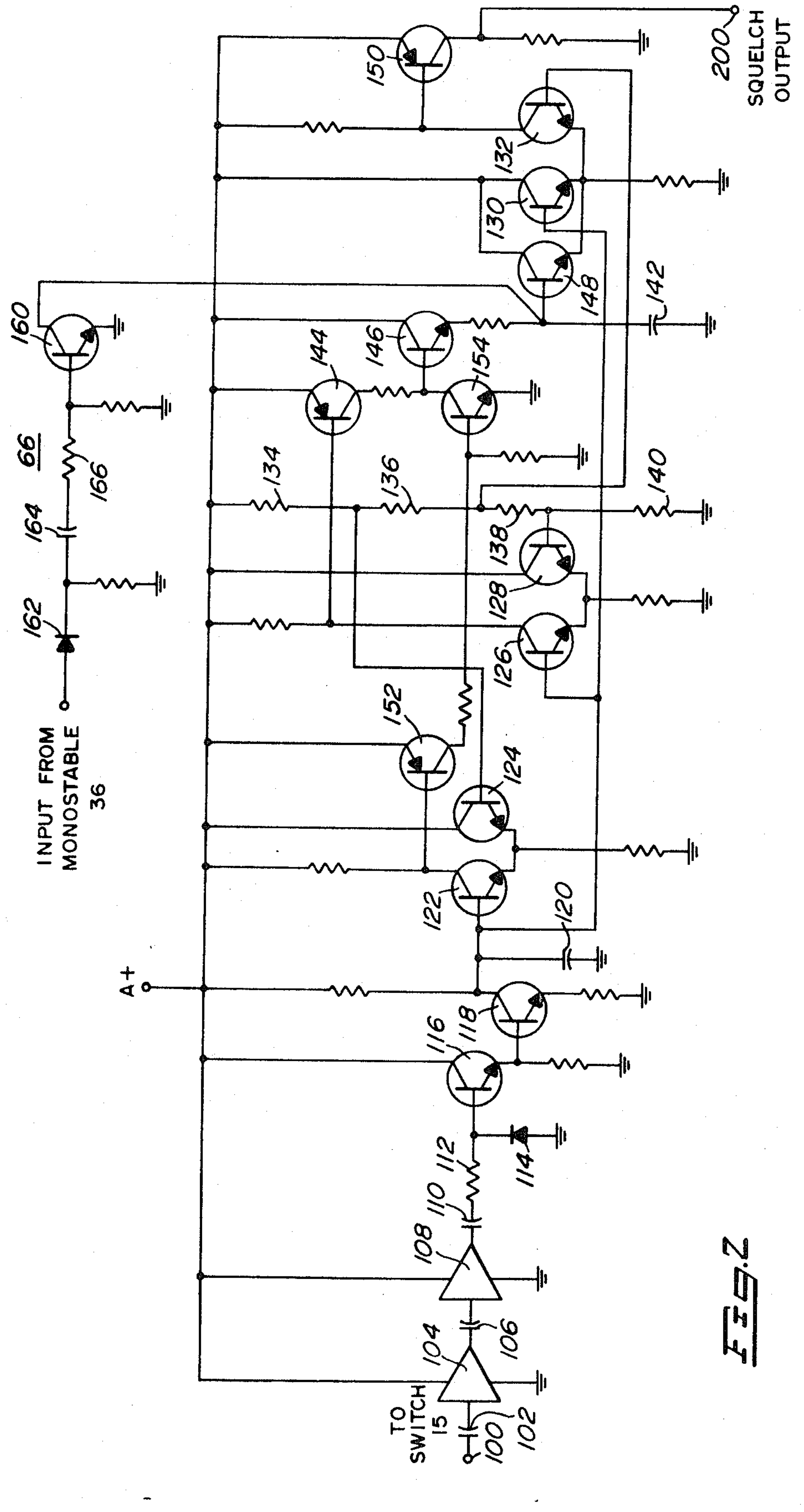
FIG. 2 is a combined block and schematic diagram of a variable response time squelch circuit that may be used in the system of FIG. 1.

Referring to FIG. 2, there is shown a combined block and schematic diagram of squelch circuit 62, variable squelch delay 64 and squelch delay control 66. In this embodiment, variable squelch delay 64 is incorporated in squelch circuit 62, and will, therefore, be described in conjunction with squelch circuit 62. Squelch circuit 62 is a discriminator noise type squelch which detects the presence of noise from discriminator 16 and provides an output indicative of the absence of a signal when discriminator noise is present. The output of discriminator 16 is coupled through switch 15 to an input point 100 of squelch circuit 62. The signal from discriminator 16 is then coupled to an amplifier 104 through a capacitor 102. The amplified output signal from amplifier 104 is further coupled to a second amplifier 108 through a second capacitor 106. Amplifiers 104 and 108 are well known in the art and may be of any type having sufficient gain to provide a suitable level signal to transistor 116. Capacitors 102 and 106 form part of a high-pass network which attenuates the low frequency portion of the noise spectrum from discriminator 16 to prevent modulation on the signal received by the receiver from being interpreted as noise by squelch 62. The amplified noise is applied to a detector stage comprising a diode 114 and transistors 116 and 118 through a capacitor 110 and a resistor 112. A filter capacitor 120 filters the detected voltage from transistor 118 and has a value chosen to provide a fast detector response time, in this embodiment, less than 6–7 milliseconds. The voltage across capacitor 120 is inversely proportional to the amount of noise received from discriminator 16, and since the amplitude of the noise is inversely proportional to the strength of the received signal, the voltage across capacitor 120 increases as the strength of the received signal increases.

The voltage appearing across capacitor 120 is applied to three differential amplifiers comprising transistors 122, 124; 126, 128; and 130, 132, respectively. Transistors 124, 128 and 132 are biased from a voltage divider network comprising resistors 134, 136, 138 and 140. The base of transistor 124 is operated at the highest bias voltage, with the base of transistor 132 being operated at an intermediate voltage and the base of transistor 128 being operated at the lowest voltage. Therefore, at relatively weak signal levels which provide a relatively low voltage across capacitor 120, transistor 126 is rendered conductive, while transistors 122 and 130 remain non-conductive. As transistor 126 is rendered conductive, the differential amplifier comprising transistors 126, 128 is rendered operative, thereby applying signals related to the voltage appearing across capacitor 120 to a capacitor 142 through transistors 144 and 146. The polarities of the transistors and the interconnections between them are chosen to cause the voltage across capacitor 142 to increase as the voltage across capacitor 120 increases. However, the rate of increase in the voltage across capacitor 142 will be greater than the rate of increase in the voltage appearing across capacitor 120 due to the amplification provided by transistors 126, 144 and 146. The value of capacitor 142 is chosen to provide a greater delay then the delay provided by capacitor 120 in order to slow down the response time of the squelch. The delay provided by capacitor 142 may be on the order of 200–500 milliseconds or whatever is required to provide adequate fade protection.

Capacitor 142 is connected to the base of a transistor 148 which forms a third stage of the differential amplifier comprising transistors 130 and 132. The voltage appearing across capacitor 142 causes transistor 148 to become conductive when the voltage across capacitor 142 exceeds the bias voltage applied to the base of transistor 132. As transistor 148 becomes conductive, transistor 132 becomes non-conductive thereby causing transistor 150, which was initially conductive, to become non-conductive, thereby reducing the voltage appearing at output point 200 substantially to ground potential in the presence of a received signal.

As the strength of the received signal increases, the voltage across capacitor 120 increases to a level that is greater than the voltage applied to the base of transistor 124. The increased voltage causes transistor 122 to become conductive, which in turn causes transistors 152 and 154 to become conductive, thereby reducing the voltage applied to the base of transistor 146. As the voltage applied to the base of transistor 146 is reduced, the voltage appearing at the emitter of transistor 146 is also reduced, which in turn causes transistor 148 to become non-conductive as the voltage across capacitor 142 is reduced by the reduced emitter voltage of transistor 146 to a level below the magnitude of the voltage applied to the base of transistor 132.

When the voltage appearing across capacitor 120 has reached a level that is sufficient to cause transistor 148 to become non-conductive, that level is also sufficient to cause transistor 130 to become conductive, thereby maintaining transistor 132 non-conductive. Hence, for relatively strong received signals, the conductivity of transistor 132, and hence the voltage appearing at output point 200, is controlled directly by the relatively fast responding voltage appearing at capacitor 120. Conversely, at relatively weak signal levels, the output voltage appearing at output point 200 is controlled by the slow reacting voltage appearing at capacitor 142, thereby providing the fade protection required at relatively weak signal levels.

As was previously described, the squelch must have a relatively fast response time during the sampling of a channel. This function is provided by the squelch delay control 66. In this embodiment, squelch delay control 66 comprises a transistor 160 having a collector coupled to the base of transistor 148. The base of transistor 160 is coupled to the output of monostable 36 through a diode 162, a capacitor 164 and a resistor 166. In operation, positive transitions of the pulses from monostable 36 are applied through diode 162, capacitor 164 and resistor 166 to the base of transistor 160, thereby making transistor 160 conductive to reduce the voltage appearing at the base of transistor 148 to make transistor 148 non-conductive and to allow the voltage appearing at output point 200 to be responsive to the fast responding voltage appearing at capacitor 120 during the sampling period. Transistor 148 remains non-conductive for a predetermined time duration following the pulse from monostable 36, the aforesaid time duration being determined partially by the value of capacitor 142. After the voltage across capacitor 142 has reached its steady state value (i.e., the voltage determined by the strength of the signal being received) the operation of the squelch circuit will return to normal operation with the response time being determined by the strength of the signal being received.

Figure 3:
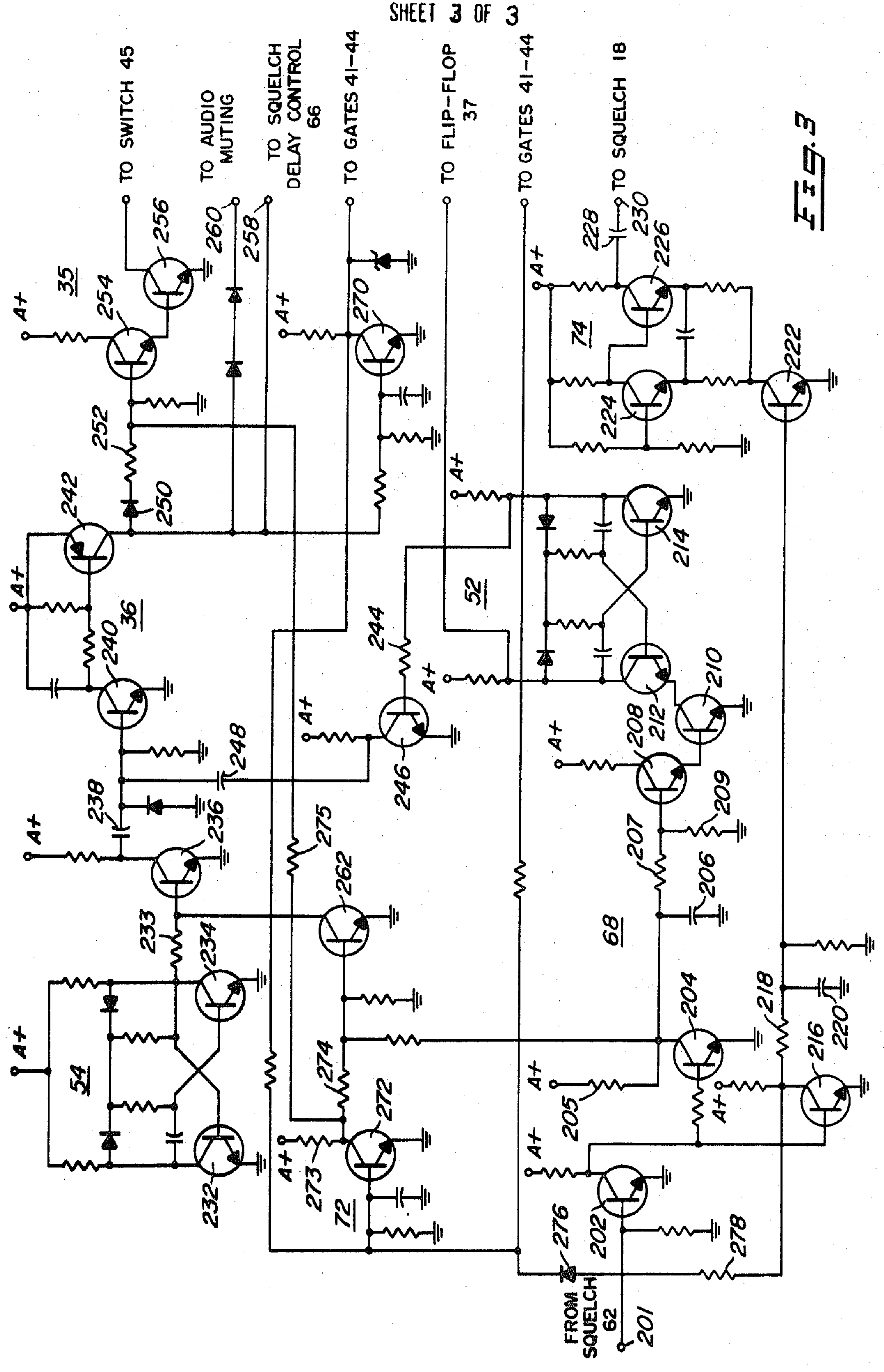
FIG. 3 is a detailed schematic diagram of a portion of the system of FIG. 1 showing the control circuitry of the system.

Referring now to FIG. 3, there is shown a schematic diagram of a portion of the circuit according to the invention including clocks 52 and 54, oscillator driver 35, monostable 36, turn-on delay 68, muting oscillator 74 and priority lock gate 72. The output point 200 of squelch circuit 62 of FIG. 2 is connected to an input point 201 of the turn-on delay circuit 68 of FIG. 3. Turn-on delay circuit 68 comprises, in this embodiment, transistors 202, 204, 208 and 210, connected in cascade, a capacitor 206 and other passive components. The delay is provided by capacitor 206. The operation of the delay circuit is as follows. When the voltage applied to input point 201 increases, indicating the absence of a signal on the channel being received, transistor 202 is rendered conductive, thereby causing transistor 204 to be rendered non-conductive. When transistor 204 is rendered non-conductive, capacitor 206 charges from power supply A+ through a resistor 205. Capacitor 206 is coupled to transistor 208 through a voltage divider network comprising resistors 207 and 209 which applies a portion of the voltage appearing across capacitor 206 to the base of transistor 208. As capacitor 206 charges, the voltage appearing at the junction of resistors 207 and 209 forward biases transistors 208 and 210. The time required for transistor 210 to be rendered conductive is dependent upon the values of capacitor 206 and resistors 205, 207 and 209. The collector of transistor 210 is connected to the emitter of a transistor 212 which, along with a transistor 214 forms an astable multivibrator 52. Transistor 210 provides a ground return for the emitter of transistor 212, thereby rendering multivibrator 52 operative to initiate scanning when transistor 210 is conductive in the absence of a received signal.

The collector of transistor 202 is also connected to the base of a transistor 216 which controls the operation of muting oscillator 74, comprising transistors 224 and 226, by means of a transistor 222 connected to transistor 216 through a resistor 218 and to oscillator 74. In operation, when no signals are present on the channel being received or during scanning, the voltage applied to point 201 by squelch circuit 62 is relatively high, thereby rendering transistor 202 conductive. The decreased voltage at the collector of transistor 202 when transistor 202 is conductive causes transistor 216 to become non-conductive which in turn makes transistor 222 conductive to provide a ground return for oscillator 74, and allows oscillator 74 to oscillate. The output signals from oscillator 74 are applied through a coupling capacitor 228 to an output point 230 which is connected to squelch circuit 18. Squelch circuit 18 is similar, in this embodiment, to the squelch circuit 62 described previously and causes the receiver audio to be muted upon receipt of a signal from oscillator 74.

The sampling clock 54 comprises, in this embodiment, a standard multivibrator circuit including transistors 232 and 234. The output of clock 54 is coupled through a resistor 233 to a transistor 236 having a collector that is coupled to monostable 36 through a coupling capacitor 238. A sampling clock inhibit transistor 262 is coupled to the output of clock 54 and to transistor 204.

In this embodiment, monostable 36 comprises resistors 240 and 242. The input of monostable 36 at the base of transistor 240 is also coupled to scanning clock 52 through a resistor 244, a transistor 246 and a coupling capacitor 248. The output of monostable 36 at the collector of transistor 242 is coupled through a diode 250 and a resistor 252 to the base of a transistor 254 which, along with transistor 256 comprises oscillator driver 35. The collector of transistor 242 is also coupled to output points 258 and 260 to operate squelch delay control 66 and to provide audio muting during priority sampling, respectively, and to a gate control transistor 270.

When the system is operating in its scanning or sampling mode, monostable 36 receives pulses either from scanning clock 52 when no signals are present, or from sampling clock 54 when a non-priority signal is present. Whether scanning clock 52 or sampling clock 54 controls monostable 36 is determined by the operation of squelch circuit 62 and turn-on delay 68. When no signals are present, transistors 210 and 262 are rendered conductive by transistor 204 in response to signals from squelch circuit 62. Since both transistors 210 and 262 are conductive, clock 52 is rendered operative and the pulses from clock 54 are shunted to ground via transistor 262. Conversely, in the presence of a signal, transistors 210 and 262 are non-conductive, thereby disabling clock 52 and allowing pulses from clock 54 to pass through resistor 233, transistor 236 and capacitor 238 to monostable 36.

Monostable 36 provides an output pulse for each pulse received from clock 52 or clock 54. The output pulses from monostable 36 are simultaneously applied to oscillator driver 35 to render transistor 256 conductive, to output points 258 and 260, and to the non-priority inhibiting gate control transistor 270. Hence, each time a pulse is produced by monostable 36, transistor 254 causes the oscillator that has been selected as priority to operate, mutes the audio, causes squelch circuit 62 to operate in its fast response mode and causes gates 41 through 45 to render all non-priority oscillators inoperative.

In this embodiment, priority locking gate 72 comprises a transistor 272 and associated passive components. The base of transistor 272 is connected to the collector of transistor 270 and through a diode 276 and resistor 278 to the collector of transistor 216. When a signal is present, the output voltage at the collector of transistor 216 is low. Similarly, when a priority channel is being sampled, the collector voltage of transistor 270 is low. Hence, when a signal is present, and when the priority channel has been selected, both voltages applied to the base of transistor 272 are low, thereby rendering transistor 272 non-conductive. The collector of transistor 272 is coupled through resistor 274 to the base of sampling pulse inhibiting transistor 262. Hence, when transistor 272 is rendered non-conductive, a voltage is applied from the power supply A+ through collector resistor 273 and coupling resistor 274 to the base of transistor 262, thereby making transistor 262 conductive and preventing pulses from clock 54 from triggering monostable 36 when a priority channel is being monitored. Simultaneously, when transistor 272 is non-conductive, voltage is applied from the power supply A+ through resistors 273 and 277 to the base of transistor 254, thereby making transistors 254 and 256 conductive to maintain the receiver locked to the priority channel until squelch circuit 62 detects a termination of the priority signal.

It should be noted that the particular gates, transistors and functional blocks employed in the foregoing explanation of the present invention are for illustration of the invention only, and similar functional blocks having other characteristics, including opposite polarity logic and detection voltages may be used and still fall within the scope of the invention. In addition, if the aforementioned receiver is to be used in conjunction with a transmitter, scanning defeat circuitry (not shown) may be employed to inhibit the scanning function during and immediately following a transmission made by the aforesaid transmitter.

In addition, it should be noted that although priority monitoring channel scanning systems were known in the past, none of these systems employs variable time constant squelch and delay systems to achieve both a high scanning and sampling speed without sacrificing weak signal performance. Another feature of the instant invention not provided by the prior art is the use of a muting oscillator to control a muting squelch circuit in response to a scanning squelch circuit to extend the dual time constant advantages to the muting function.

I claim:

1. A channel scanning and priority channel monitoring system for use with a radio receiver of the superheterodyne type for receiving signals on a predetermined number of channels, with one channel being designated a priority channel, which receiver has mixing means operative to provide reception on different channels, and oscillator means connected to the mixing means for providing signals to the mixing means at different frequencies corresponding to the different channels, said channel scanning and priority system including in combination:

pulse responsive switching means having at least first and second conditions of operation;

means for coupling said switching means to said oscillator means for controlling the output frequency of said oscillator means in accordance with the condition of operation of said switching means;

clock means coupled to said switching means for providing clock pulses thereto at first and second predetermined frequencies, said clock pulses causing said switching means to change condition of operation;

detector means for detecting the presence of a received signal on the channel associated with the output frequency of the oscillator;

means coupling said detector means to said clock means for causing said clock means to provide pulses at said first frequency in the absence of a received signal and at said second frequency upon receipt of a signal;

delay means coupled to said clock means for delaying the application to said switching means of said pulses of said first frequency for a predetermined time duration following termination of a received signal; and means coupled to said switching means and responsive to a predetermined condition of operation of said switching means for maintaining said switching means in said predetermined condition of operation upon receipt of a signal on a channel associated with said predetermined condition of operation.

2. A system as recited in claim 1 wherein said detector means includes control means for varying the response time thereof.

3. A system as recited in claim 2 further including means responsive to the strength of the received signal so that said response time is longer for weak signals than for strong signals.

4. A system as recited in claim 2 further including means coupled to said switching means and responsive to said predetermined condition of operation thereof for decreasing the response time of said detector means.

5. A system as recited in claim 4 wherein said means for coupling said switching means to said oscillator means includes selector means for controlling said oscillator means to provide an output signal of the frequency to operate said mixing means and provide reception by said radio receiver of signals on a priority channel upon operation of said switching means to said predetermined condition.

6. A system as recited in claim 1 wherein said clock means includes a first clock for providing pulses at said first predetermined frequency, and a second clock for providing pulses at said second predetermined frequency.

7. A system as recited in claim 1 wherein said means for maintaining said switching means in said predetermined condition of operation includes gate means coupled to said switching means for making said switching means non-responsive to pulses from clock means.

8. A system as recited in claim 1 wherein said switching means includes a counting circuit having a plurality of stages in excess of two.

9. A system as recited in claim 1 wherein said radio receiver includes an audio amplifier and audio reproducing means and further includes means for attenuating the signals applied to the audio amplifier, said attenuating means being operated in response to output pulses from said clock means.

10. A system as recited in claim 9 wherein said receiver includes alternating current signal responsive squelch means coupled to said audio amplifier for interrupting the signals applied to said audio amplifier in response to said alternating current signals.

11. A system as recited in claim 10 further including squelch control oscillator means coupled to said detector means and responsive thereto for generating alternating current signals in response to control signals from said detector means, said squelch control oscillator means being further coupled to said squelch means for control thereof in response to said detector means.

12. A system as recited in claim 11 wherein said receiver further includes modulation detection means and second switch means for selectively coupling said modulation detection means to one of said squelch means and said detector means.

13. A channel scanning system for use with a radio receiver for receiving signals on a predetermined number of channels, including in combination, pulse responsive switching means for selecting one of said predetermined channels, means for coupling said switching means to said receiver, pulse producing means having first and second conditions of operation connected to said switching means for causing said switching means to change channels in response to said pulses, detector means for connection to said receiver for detecting the presence of a signal on a channel and for altering the condition of operation of said pulse producing means upon receipt of a signal by said receiver, said detector means including means for varying the response time of said detector means in response to the strength of the signal being received by said receiver, and delay means coupled to said pulse producing means for maintaining the altered condition of operation of said pulse producing means for a predetermined time duration following the termination of said signal.

14. A system as recited in claim 13 wherein said detector means includes means for reducing the response time of said detector means in response to pulses from said pulse producing means.

15. A radio receiver of the superheterodyne type for receiving signals on a predetermined number of channels including in combination:

mixing means operative to provide reception by said radio receiver on said predetermined channels;

oscillator means connected to said mixing means for providing output signals to said mixing means at different frequencies corresponding to said predetermined channels;

pulse responsive switching means, having at least first and second conditions of operation, coupled to said oscillator means for controlling the output frequency of said oscillator means in accordance with the condition of operation of said switching means;

first clock pulse producing means coupled to said switching means for providing clock pulses thereto at a first predetermined frequency, said clock pulses causing said switching means to change condition of operation;

second clock pulse producing means coupled to said switching means for providing clock pulses thereto at a second predetermined frequency for causing said switching means to change condition of operation;

detector means coupled to said receiver for detecting a received signal, said detector means being coupled to said first and second clock means for causing said first clock means to operate said switching means in the absence of a received signal, and for causing said second clock means to operate said switching means in the presence of a received signal;

delay means coupled to said first clock pulse producing means for delaying the application of said first frequency pulses to said switching means for a predetermined time duration following termination of a received signal; and means coupled to said detector means for varying the responsse time thereof in accordance with the strength of the signal being received by said receiver, and for reducing the response time of said switching means for a predetermined time duration following a predetermined change in the condition of operation of said switching means.

16. A system as recited in claim 15 wherein said first clock pulse producing means includes a first astable multivibrator coupled to said detector means responsive thereto for providing said first frequency pulses in the absence of a received signal by said receiver.

17. A system as recited in claim 16 further including a monostable multivibrator coupled to said first astable multivibrator and responsive thereto for providing pulses having a time duration substantially equal to one-half of the time interval between pulses of said first clock for changing the condition of operation of said switching means.

18. A system as recited in claim 17 wherein said second clock pulse producing means includes a second astable multivibrator coupled to said detector means and responsive thereto for providing said second frequency pulses in the presence of a received signal.

19. A system as recited in claim 18 wherein said monostable multivibrator is further coupled to said second astable multivibrator responsive thereto for changing the condition of operation of said switching means.

20. A system as recited in claim 15 wherein said delay means is interposed between said detector means and said first clock pulse producing means, and includes a capacitor for delaying the operation of said first clock for a predetermined time duration following the termination of a received signal.

21. A system as recited in claim 15 further including indicator means coupled to said switching means and responsive thereto for visually indicating the channel being monitored.

22. A radio receiver of the superheterodyne type for receiving signals on a predetermined number of channels including in combination:

mixing means operative to provide reception by said radio receiver on said predetermined channels;

oscillator means connected to said mixing means for providing output signals to said mixing means at different frequencies corresponding to said predetermined channels, said mixing means providing intermediate frequency signals in response to said output signals;

intermediate frequency amplifier means coupled to said mixing means for receiving and amplifying said intermediate frequency signals from said mixing means;

modulation detection means coupled to said intermediate frequency means for receiving said amplified intermediate frequency signals and detecting the modulation thereon, said modulation detection means providing signals in response to said modulation;

amplifier means coupled to said detection means for receiving and amplifying said signals therefrom;

signal detector means coupled to one of said modulation detection and intermediate frequency amplifier means for detecting the strength of any signal received by said receiver and for providing a control signal in response thereto;

alternating current signal responsive muting means coupled to said audio amplifier means for rendering said amplifier means substantially nonresponsive to said signals received from said modulation detection means; and alternating current signal generating means coupled to said signal detector means and to said muting means, said alternating current signal generating means being responsive to said control signals for providing alternating current signals to operate said muting means in response to said control signals from said detection means.

23. A radio receiver as recited in claim 22 wherein said modulation detection means includes a discriminator providing modulation and noise signals, and said signal detector means includes a first squelch circuit connected to said discriminator and responsive to the noise signals provided by said discriminator, said alternating current signal responsive muting means including a second noise responsive squelch circuit connected to said alternating current signal generating means, and wherein said alternating current signal generating means includes means responsive to said first squelch circuit for providing signals for actuating said second squelch circuit, said last mention signals being generated in response to the noise signals received by said first squelch for causing said second squelch circuit to mute said receiver in response to noise signals received by said first squelch circuit.

24. A radio receiver as recited in claim 23 further including switch means connected to said discriminator and said first and second squelch circuits for selectively coupling one of said first and second squelch circuits to said discriminator.

* * * * *